US006964044B1

(12) United States Patent
Hudson et al.

(10) Patent No.: US 6,964,044 B1
(45) Date of Patent: Nov. 8, 2005

(54) SYSTEM AND PROCESS FOR MANAGEMENT OF CHANGES AND MODIFICATIONS IN A PROCESS

(75) Inventors: Charles A. Hudson, Richmond, VA (US); Sandra Bergh, Powhatan, VA (US); Robert Harrington, Richmond, VA (US)

(73) Assignee: Genworth Financial, Inc., Richmond, VA (US)

( * ) Notice: Subject to any disclaimer, the term of this patent is extended or adjusted under 35 U.S.C. 154(b) by 684 days.

(21) Appl. No.: 09/680,332

(22) Filed: Oct. 6, 2000

(51) Int. Cl.[7] ............................................ G06F 9/445
(52) U.S. Cl. ...................... 717/177; 717/171; 717/172; 717/176; 709/203; 709/224; 709/232
(58) Field of Search ........ 717/168–178; 707/203–232; 709/221

(56) References Cited

U.S. PATENT DOCUMENTS

| | | | |
|---|---|---|---|
| 4,809,170 A | 2/1989 | Leblang et al. | |
| 5,339,435 A | 8/1994 | Lubkin et al. | |
| 5,473,772 A * | 12/1995 | Halliwell et al. | ............ 717/171 |
| 5,720,007 A | 2/1998 | Hekmatpour | |
| 5,732,213 A * | 3/1998 | Gessel et al. | ................ 709/224 |
| 5,904,485 A | 5/1999 | Siefert | |
| 5,999,741 A * | 12/1999 | May et al. | ...................... 707/10 |
| 6,006,034 A * | 12/1999 | Heath et al. | .................. 717/170 |
| 6,104,874 A | 8/2000 | Branson et al. | |
| 6,157,808 A | 12/2000 | Hollingsworth | |
| 6,256,773 B1 | 7/2001 | Bowman-Amuah | |
| 6,269,340 B1 | 7/2001 | Ford et al. | |
| 6,282,404 B1 | 8/2001 | Linton | |
| 6,324,693 B1 * | 11/2001 | Brodersen et al. | ........... 717/170 |
| 6,330,600 B1 | 12/2001 | Matchefts et al. | |
| 6,366,889 B1 | 4/2002 | Zaloom | |
| 6,367,077 B1 * | 4/2002 | Brodersen et al. | ........... 717/170 |
| 6,405,364 B1 | 6/2002 | Bowman-Amuah | |
| 6,496,870 B1 | 12/2002 | Faustini | |
| 6,546,230 B1 | 4/2003 | Allison | |
| 6,567,819 B1 | 5/2003 | Cheng et al. | |
| 6,591,417 B1 * | 7/2003 | Strysniewicz et al. | ....... 717/168 |
| 6,691,253 B1 * | 2/2004 | Gillenwater et al. | ........... 714/36 |

OTHER PUBLICATIONS

Dejean et al. ACM Computing Surveys, vol. 32, No. 3. Sep. 2000, pp. 241-299.*
International Search Report dated Mar. 11, 2003 for Application No. PCT/US01/31382, filed Oct. 9, 2001.

* cited by examiner

Primary Examiner—Tuan Dam
Assistant Examiner—Chuck Kendall
(74) Attorney, Agent, or Firm—Hunton & Williams

(57) ABSTRACT

A system and process for managing the migrating enhancements into a production software system is described. Enhancements are first migrated to a model system. After any issues are identified and addressed, the enhancements are migrated to the production software system. An electronic change management process is provided for assisting a developer in providing information about an enhancement to a change manager. An assurance tool of migration strategies is provided for tracking changes and avoiding conflicts between the enhancement and the model and production software systems. Information gathered in the change management may be used for providing an objective evaluation of developers of enhancements.

30 Claims, 11 Drawing Sheets

| E-CMP | |
|---|---|
| Request Date | 1/22/2000 |
| Cost Center | |
| Project Number | |
| Task Number | |
| Short Name | |
| Application Name | |
| Developer First Name | |
| Developer Last Name | |
| Developer E-mail | |
| Developer Location (city) | |
| Developer Phone | |
| Project Lead Name(s) | |
| Platform | ▼ |
| Are there source changes | ○ Yes ○ No |
| Are there distribution changes | ○ Yes ○ No |
| Are there scheduling requirements? | ○ Yes ○ No |
| Is SAR used | ○ Yes ○ No |
| User Comments | |

Submit   Reset

FIG. 4

| JCL/PROC Changes: Yes |||||
|---|---|---|---|---|
| How Many New Jobs | ⬚ ~304 ||||
| How Many Existing Jobs | ⬚ ||||
| Restart / Rerun Requirements | ○ Yes  ○ No ||||
| Number of JCL changes | ⬚ ||||
| Number of PROC changes | 308 ⬚ ||||
| Model Office/Production | ☐ Model Office  ☐ Production ||||
| New Member | ⬚ ▼ | Jobscan Job Name | ⬚ ||
| Member Name(s) | ⬚ | JobScan Job # | ⬚ ||
| Type | ⬚ ▼ ~306 | Compare Job Name | ⬚ ||
| For New Control Lib Members Include Lib Name | ⬚ | Compare Job # | ⬚ ||
| Have you chosen Media other than that recommended by the allocation matrix? | ○ Yes  ○ No ||||
| If Yes then why? | ⬚ ||||
| If disk file, is there any reason why this data set cannot be compressed? | ○ Yes  ○ No ||||
| If Yes then why? | ⬚ ||||

302 (left bracket for upper section), 300 (form label)

FIG. 5

| ECMP | Date | RFS# (Cost Center Project Number Task Number) | Short Name | Application | Developer Name | Status | Change Management Assigned |
|---|---|---|---|---|---|---|---|
| 371 | 1/24/00 | 1111:2222:3333 | Short Name | Application Name | Developerfname Developerlname | RC | |

ECMP - CHANGE MANAGEMENT INFORMATION

| ECMP - DETAIL LEVEL | |
|---|---|
| Request Date | 1/24/00 |
| Cost Center | 1111 |
| Project Number | 2222 |
| Task Number | 3333 |
| Short Name | Short Name |
| Platform 502 | Mainframe |
| Source Control Tool | PAN APT |
| Distribution Tool | DISPATCH |
| Scheduling Requirements | Yes |
| JCL/PROC | Yes |
| GDG | Yes |
| Tape Retention | Yes |
| File Allocation | Yes |
| File Replacement | Yes |
| SAR | Yes |
| Developer Name | Developerfname Developerlname |
| Developer Phone | (555)555-5555 |
| Developer Email | Developerfname.Developerlname@gecapital.com |
| Developer Location | Developer Location |
| Developer Comments | This is an example |
| Project Lead(s) | Project Leader |
| Status | RC |
| 504 Change Management | |
| CM Comments 506 | |
| Complete Date | |

SYSTEM AND PROCESS FOR MANAGEMENT OF CHANGES AND MODIFICATIONS IN A PROCESS

FIELD OF THE INVENTION

The present invention relates to a system and process for managing enhancements to software installed on a working system, and more particularly to a system and process for managing enhancements to software by managing a migration of the enhancements to a model system, and then managing a migration of the enhancements to a production system.

BACKGROUND OF THE INVENTION

Computer software systems are prevalent in almost all facets of modern life. Many businesses, such as financial service providers, Internet web sites, and shipping companies, just to name a few, rely on computer software systems for day to day activities. Often, computer software systems (or "software systems") may dynamically evolve, where functions of the software systems are added, deleted, or modified to provide enhancements for users of the software system.

A difficulty associated with such enhancements may include ensuring that all necessary program modules within a software system have been modified appropriately. By way of example, adding a new function to a software system may require modifications to three program modules within the software system. Failure to modify all three program modules may result in the function and/or the entire software system not being able to operate.

Another difficulty may involve determining what developer, team or office is responsible for an enhancement. Modifications to a software system may be performed by different developers and/or teams. Developers or teams may be at different physical locations (e.g., different offices), and people or members of the same team may be at different locations. The team and/or developer responsible for a particular enhancement may be difficult to determine.

Another problem may involve measuring the quality of the enhancements being created. Various enhancements may have a number of areas for potential error. Objectively evaluating the performance and work quality of the developer may be difficult.

Other drawbacks may also exist.

SUMMARY OF THE INVENTION

It is therefore desirable that the invention overcome these and other drawbacks of present systems and methods.

Thus, there is need to provide a system and process for managing changes within a computer software system.

To achieve this invention, as embodied and broadly described herein, a process for managing migration of one or more enhancements of a software application on a working software system comprises the steps of receiving at least one enhancement of the software application from the developer; receiving approval of the at least one enhancement from a quality assurance module; analyzing the at least one enhancement to ensure conformity with the model software system, migrating the at least one enhancement to the model software system, where the model software system includes the software application of the working software system installed on a model system; analyzing the migration of the at least one enhancement to the model software system, notifying at least one entity of the migration of the at least one enhancement to the production software system; analyzing the at least one enhancement to ensure conformity with the production software system; and migrating the at least one enhancement to the production software system.

The accompanying drawings, which are incorporated in and constitute a part of this specification, illustrate an embodiment of the invention and, together with the description, serve to explain the principles of the invention.

BRIEF DESCRIPTION OF THE DRAWINGS

FIG. 4 is an example of a graphic user interface for inputting information according to an embodiment of the invention.

FIG. 5 is an example of a graphic user interface for providing information regarding JCL/PROC changes, according to an embodiment of the invention.

FIG. 6 is an example of a graphic user interface for displaying a record request according to an embodiment of the invention.

FIG. 7 is an example of a graphic user interface for displaying detailed information of a record request according to an embodiment of the invention.

FIG. 9 is an example of a graphic user interface for presenting information within an assurance tool of migration strategies according an embodiment of the invention.

DETAILED DESCRIPTION OF THE INVENTION

Figure 1:
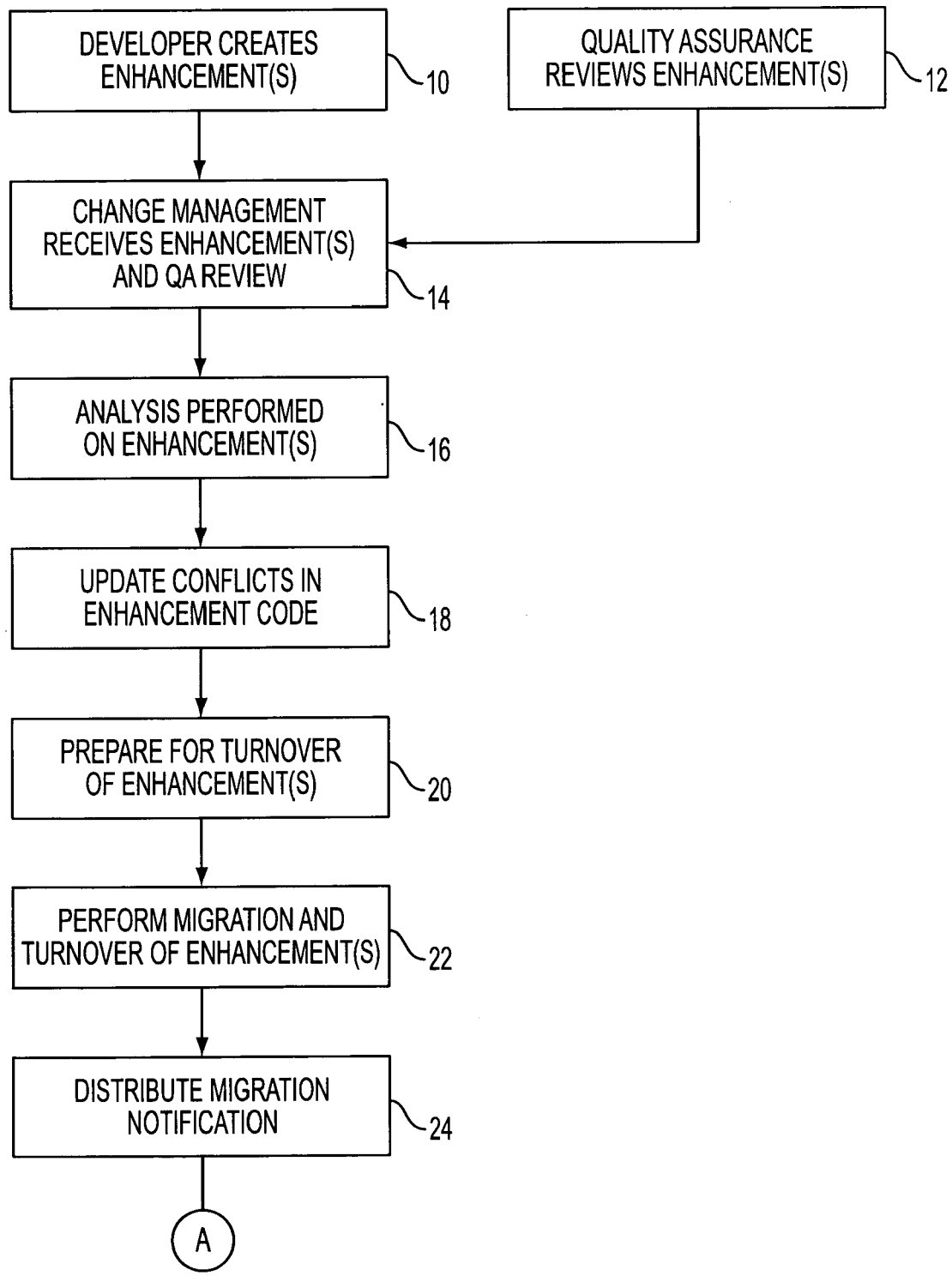
FIGS. 1 and 2 disclose a flowchart illustrating steps in a process of managing the migration of one or more enhancements of a software application on a production software system according to an embodiment of the invention.

Reference will now be made in detail to the present preferred embodiment of the invention. An example which is illustrated in the accompanying drawings in which like reference characters refer to corresponding elements.

Change Management

FIG. 1 is a flowchart illustrating steps in a process for managing changes and modifications for a software system in a model environment (also referred to as "change management"). Particularly, the process may comprise first managing one or more changes in a model software system, correcting all problems identified during the migration of the changes, and then managing changes in a production software system. While the process illustrated in FIG. 1 discloses certain steps performed in a particular order, it should be understood that the present invention may be practiced by adding one or more steps to the process, omitting steps within the process, and/or altering the order in which one or more steps are performed.

At step 10, the developer creates one or more enhancements to a software system. A software system may comprise one or more program modules within the software system. Enhancements to a software system may comprise one or more modifications to one or more existing program modules within the software system, or may comprise adding one or more new program modules to the software system. Modifications may also include changes to existing computer codes within a program module, or within a software system. According to an embodiment of the invention, one or more enhancements may be developed in response to a function request, such as a request for service ("RFS"). An RFS may include a description of the one or more enhancements, as well as the portions of software system to be modified. Other types of enhancements may also be used.

A quality assurance module evaluates the one or more enhancements at step 12. A quality assurance module may include one or more quality assurance personnel to review the one or more enhancements to ensure that certain quality requirements are met in the one or more enhancements. The quality requirements may include ensuring the robustness of an enhancement, eliminating errors, ensuring that an enhancement complies with a RFS or other quality requirements.

At step 14, the one or more enhancements and information about the one or more enhancements are received at a change management module. According to an embodiment of the invention, the developer may create an enhancement in response to a request for services (RFS), where the RFS may describe the desired enhancements, functions to be included, portions of the software system to be altered and other information. The developer may forward the completed enhancement(s) and the RFS to the change management module. According to an embodiment of the invention, an appropriate party at the change management module may first review the received enhancement(s) and confirm that any specifications in the RFS have been met.

According to an embodiment of the invention, the developer may also create an electronic change management process ("ECMP") document to use with the change management process for the one or more enhancements. The ECMP document may contain information needed by the change management module to perform its functions. ECMP will be described in greater detail below. Other manners for receiving one or more enhancements may also be used.

At step 16, the one or more enhancements are analyzed for conformity with the model software system. According to an embodiment of the invention, analysis of the one or more enhancements may comprise reviewing the RFS, reviewing source control data, reviewing the job control language ("JCL") such as for launching a particular application within the software system, determining a scheduling for migration of the enhancements, determining a distribution for migration of one or more the enhancements, reviewing operator instructions for the enhancement, and review one or more special instructions for the one or more enhancements.

Reviewing the RFS may include reviewing an enhancement to ensure that a plurality of specifications and requirements of an appropriate RFS have been addressed. Reviewing source control data may include determining where the source control data is located, a condition of the source control data, and other aspects of the source control data. Determining scheduling and distribution may include determining a schedule for migrating the one or more enhancements into a model software system, determining where the enhancement needs to be distributed (e.g., what program module(s) and/or office(s) will receive an enhancement), and/or analyzing a proposed schedule and distribution for migration. Scheduling may also include when an enhancement or application associated with an enhancement, will be activated, or run, and the frequency of activation in a model software system and/or a production software system. Distribution may also refer to the generation and delivery of output or results when the enhancement or application associated with the enhancement is activated. This distribution may be delivered to specified locations and/or individuals for the model software system and/or the production software system. For example, migrating an enhancement into a software system, whether a model software system or a production software system, may require migrating the enhancement in different phases onto portions of the software system located in different areas. Thus, migration may entail a multi-step process of replacing and/or adding to portions of the software system. Each step may have to be performed at one or more physical locations (e.g., a central processing location and a number of data entry locations). A schedule and a distribution for migration, proposed by the developer, for example, may be reviewed to determine its feasibility, as well as how the schedule and distribution interact with the schedules and distributions for other enhancements. Analysis may also include reviewing operator instructions and/or other instructions associated with the enhancement. Other portions of an enhancement may also be analyzed.

At step 18, conflicts within the one or more enhancements, or the program modules associated with the one or more enhancements are updated. According to an embodiment of the invention, an assurance tool (also referred to as "ATOMS") may be used to update conflicts due to an enhancement. The assurance tool and a process for using the assurance tool will be described in greater detail below.

At step 20, preparation for migration of enhancements to a model system is performed. Preparation may include consulting the ECMP document to ensure that information necessary for the migration of enhancements is available, consulting a production turnover tool, such as PanAPT, and/or consulting an automated production control ("APC"). A production turnover tool may be a source control tool that enables change management personnel to migrate source changes into the model software system and/or the production software system. An APC tool may be used to communicate scheduling requests to personnel responsible for entering the scheduling information into a scheduling system. Other functions may also be included in the preparation for turnover of the changes.

At step 22, migration of the one or more enhancements to the model software system are performed. Migration may be performed in a conventional manner known to those in the art, such as by adding the enhancements to the model software system. According to an embodiment of the invention, during migration the one or more enhancements, an RFS, conflicts, the ECMP document, a distribution schedule and/or other information may be reviewed.

At step 24, one or more migration notifications are distributed. The migration notifications may be sent to developers, quality assurance, users of the production software system which was changed by the one or more enhancements, users of functions in the production software system which was changed, and others who may be effected by a migration of the one or more enhancements to the production software system. The migration notifications may include indicating when the one or more enhancements were migrated, providing documentation necessary for the migration (e.g., instructions for implementing the enhancement(s), new or updated user manuals, etc.), indicating what portions of the software system will be changed, indicating how any functionality were changed, and other information.

A quality assurance module signs-off on the enhancements at step 26. A quality assurance module may include one or more quality assurance personnel to review the enhancements to ensure that certain requirements are met in the enhancements, such as reviewing a RFS. The quality assurance module may also review the migration to the model system to ensure that the proper changes were made and to determine what if any problems exist. The quality requirements may include ensuring the robustness of the enhancements, eliminating any errors and problems, or dealing with other quality requirements. Signing-off on these quality requirements may include indicating that the quality requirements have been met. At step 28, a sign-off by the quality assurance module is received by a change management module. According to an embodiment of the invention, the change management module may be the same change management module as in step 14 above.

At step 30, the one or more enhancements to the production software system are analyzed to ensure conformity with the production software system. According to an embodiment of the invention, analysis of the enhancements and changes may comprise reviewing the RFS, reviewing source control data, reviewing the JCL, determining a schedule for migration of the enhancements and changes, determining a distribution of one or more of the enhancements, reviewing operator instructions for the enhancements, and reviewing one or more special instructions for the enhancements.

As described above with regard to the model software system, reviewing an RFS may include reviewing an enhancement to ensure that it meets the specifications and requirements of an appropriate RFS. Reviewing source control data may include determining the location of the source control data, the condition of the source control data, and other aspects of the control source data. Determining scheduling and distribution may include determining the schedule for migrating the enhancement into a production software system, determining where the enhancement needs to be distributed, and/or analyzing a proposed schedule and distribution for migration. Scheduling may also include when an enhancement or application associated with an enhancement, will be activated, or run, and the frequency of activation in a model software system and/or a production software system. Distribution may also refer to the generation and delivery of output or results when the enhancement or application associated with the enhancement is activated. This distribution may be delivered to specified locations and/or individuals for the model software system and/or the production software system. As described above, an example of migrating an enhancement into a software system, whether a model software system or a production software system, may require migrating the enhancement in different phases onto portions of the software system located in different areas. Thus, migration may entail a multi-step process of replacing and/or adding to portions of the software system. Each step then has to be performed at one or more physical locations (e.g., a central processing location and a number of data entry locations). A schedule and distribution for migration, proposed by the developer for example, may be reviewed to determine feasibility of the schedule and distribution, as well as how the schedule and distribution interact with the schedules and distributions for other enhancements. Analysis may also include reviewing operator instructions and/or other instructions associated with the enhancement. Other portions of an enhancement may also be analyzed.

At step 32, conflicts within the one or more enhancements and the program modules in the production software system are resolved. According to an embodiment of the invention, as with migration to a model software system, an assurance tool may be used to resolve conflicts in code of a source control data in a migration to a production software system. The assurance tool and the process for using the assurance tool will be described in greater detail below.

At step 34, preparation for migration of enhancements to a production software system is performed. Preparation may include consulting an ECMP document to ensure that information necessary for the migration of enhancements is available, consulting PanAPT, and/or consulting APC. Other functions may also be included in preparing for turnover of the changes.

At step 36, the migration of the one or more enhancements to the production software system are performed. Migration may be performed in a conventional manner known to those in the art, such as by adding the enhancements to the production software system. According to an embodiment of the invention, during migration of the one or more enhancements, an RFS, conflicts on the ECMP document, a distribution schedule and/or other information may be reviewed.

At step 38, one or more migration notifications are distributed. The migration notification may be sent to developers, quality assurance users of the production software system which was changed by the one or more enhancements, users of any function in the production software system which was changed, and others who may be effected by the migration of one or more enhancements to the production software system. The migration notification may include indicating when one or more enhancements were made, providing documentation necessary for the migration (e.g., instructions for implementing the enhancement(s), new or updated user manuals, etc.), indicating what portions of a system were changed, indicating how functionality was changed, and other information.

At step 40, warranty placement is performed. Warranty placement may indicate that an enhancement has been moved to the production software system and is under warranty for a specified time period (e.g., thirty days, three months, one year, etc.) in the event a defect occurs. Warranty placement may be a status indicator in the production software system, where warranty placement (or WP) indicates the warranty is still in effect, while complete (or CP) indicates that the specified time period has expired and the status of the change is complete.

According to an embodiment of the invention, a change management process may provide for migration of enhancements and changes (via migration of software code within a production software system, for example) in two phases. The first phase may provide for a "dress-rehearsal" migration of one or more enhancements to a model software system. Various modules (e.g., the change management module, the quality assurance module, etc.) within the change management process may review the migration to the model software system to ensure that the migration of the one or more enhancements is properly performed. Any problems or issues that arise during migration to the model software system may then be addressed by the modules. With these systems problems or issues addressed, the second may provide for real implementation of the enhancements or changes on to a production system.

Electronic Change Management Process (ECMP)

As described above, an electronic change management process (ECMP) may be used in connection with an overall, change management process as a communication tool for development of enhancements changes. According to an embodiment of the invention, the ECMP may be an online process that replaces the paper processes between developers and those involved with change management. While the ECMP is illustrated in FIG. 3 as being comprised of certain steps performed in a particular order, it is understood that the present invention may be practiced by adding steps to the process, omitting steps within the process, and/or altering the order in which steps in the process are performed.

Figure 2:
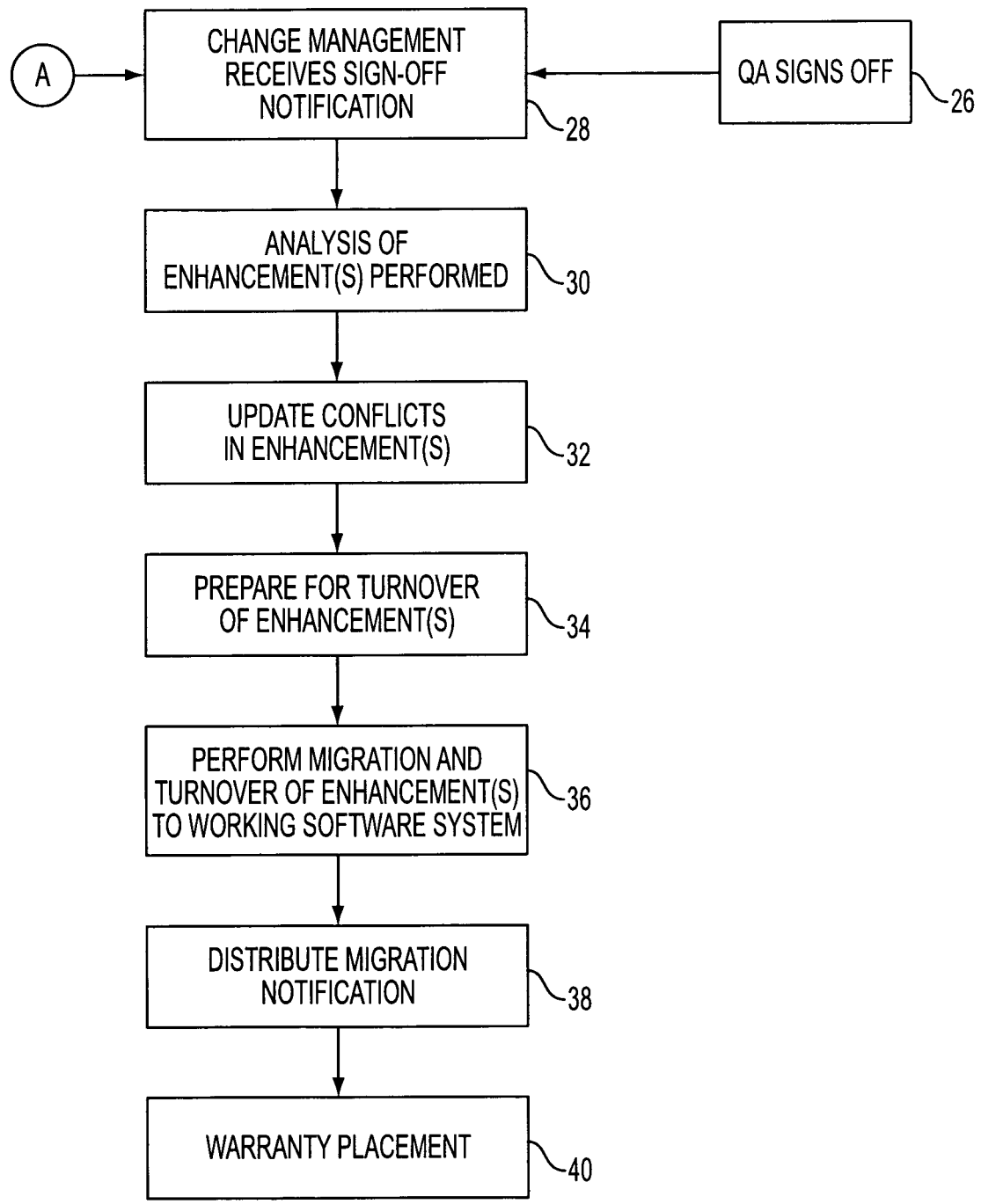
Figure 3:
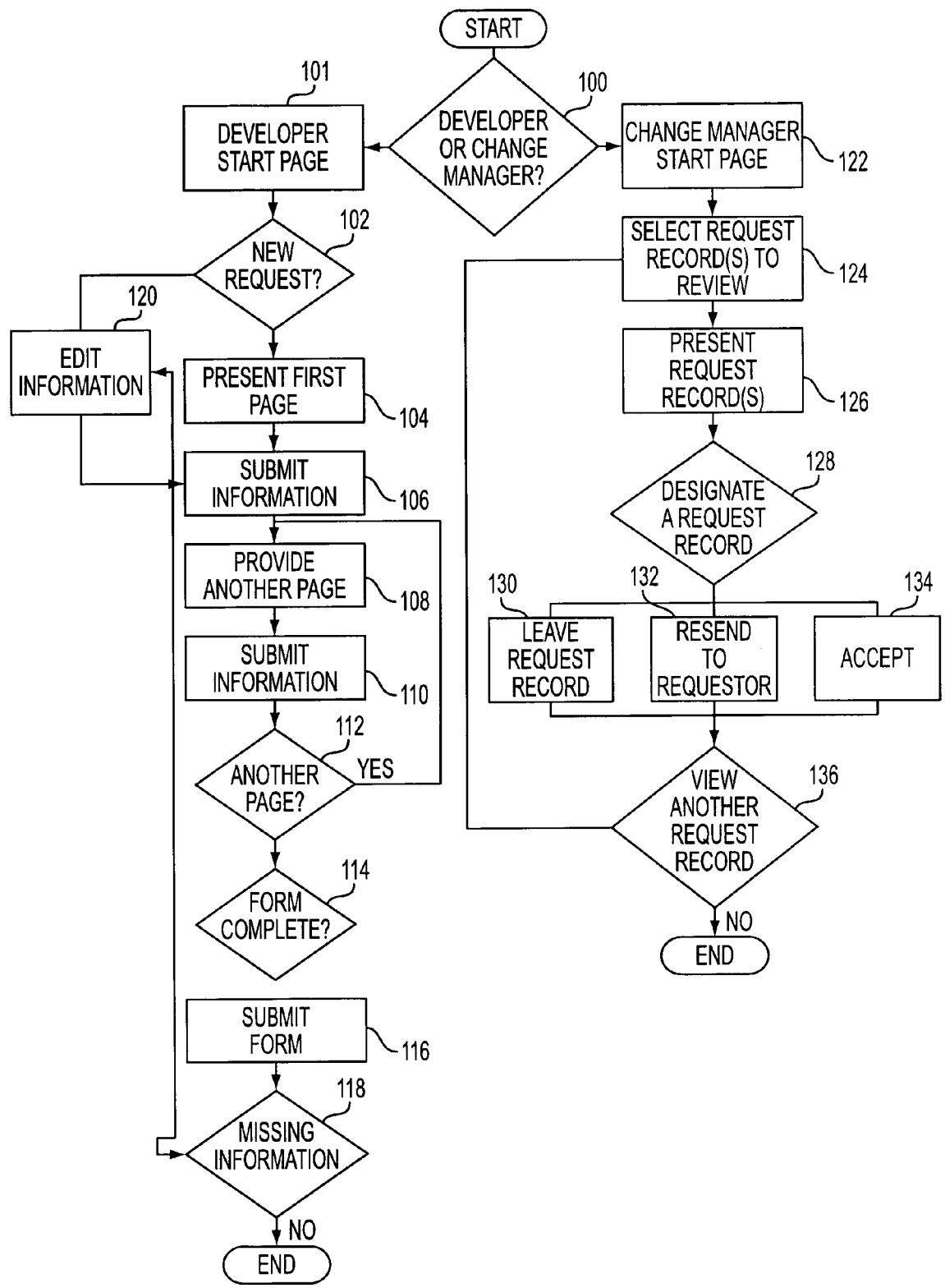
FIG. 3 is a flowchart illustrating steps in an electronic change management process according to an embodiment of the invention.

FIG. 3 is a flowchart illustrating the ECMP according to an embodiment of the invention. The process begins, and the user of the ECMP indicates whether the developer start page or a change manager start page is presented at step 100 based on who is using the ECMP. A developer start page may be a screen, such as a graphic user interface displayed on display module 808, which presents information of interest to a developer, as will be described in greater detail below. A change manager start page may be a screen, such as a graphic user interface displayed on display module 808, which presents information of interest to a change manager, as will be described in greater detail below. According to an embodiment of the invention, one or more change mangers may be associated with a change management module as described above with regard to FIGS. 1 and 2. If the developer is using the ECMP, the developer start page is presented to the user at step 101. The user may be presented with various information on the developer start page, such as basic instructions, information about the type of software system using the ECMP, or other types of information that may be relevant to the developer start page.

The developer start page presents the user with a number of options for interacting with the ECMP, at step 102. According to an embodiment of the invention, options may include initiating the ECMP to create a new ECMP document to request approval of one or more enhancements (hereinafter referred to as a "request"), editing a previously saved request using ECMP, or editing a previously submitted request using ECMP.

If the user decides to create a new request, the ECMP presents a first page requesting information at step 104. According to an embodiment of the invention, as illustrated in FIG. 4, a graphic user interface 200 may include various areas for the user to provide information to the ECMP. An area may include a label area 202 indicating a type of information to be entered and a data entry area 204 for the user to input the information. According to an embodiment of the invention, certain data entry areas 204 may be automated, where the information is input by the ECMP without action by the user. By way of example only, a date and time a new request is initiated, as well as a time when the request was last edited, may be automatically entered in an appropriate data entry area 204 when the user starts a new request. The data entry area 204 area may also include a pull down menu 206, where the user pulls down a menu and selects from a list of options. The data entry area 204 may also include a graphic button 208, where the user may activate a graphic button 208 to indicate an answer (e.g., activate a yes graphic button). Other manners of providing information may also be used.

An initial page presented to the user may gather core information needed to complete a request for approval of an enhancement. Of the core information, certain information may be required to process a request. According to an embodiment of the invention, a plurality of required fields for information requested may be indicated to the user (e.g., marked in color). The information requested by the required fields may include a date of a request, a request identification indicia, a project identification indicia (where a project may comprise one or more developers working on one or more enhancements for a production software system), a name of a software application an enhancement will effect, the user's name, the user's contact information (e.g., a telephone number, an address, an e-mail address, an office location, etc.), one or more leaders of a project, a project platform used, whether a job control language ("JCL") library is being used, whether a PROC catalogued procedure library is being used, whether a generation dataset needs to be built, whether a tape retention for an enhancement is necessary, whether a file allocation is necessary, whether a file replacement is necessary (and if so, what files should be copied, a location of the file, and a location where the file is to be copied to), other changes to a program module and/or production software system (such as changes in the computer sources code), a plurality of source control tools, a plurality of distribution changes, a plurality scheduling requirements, a plurality of operators' instructions, and a plurality of user comments. According to an embodiment of the invention, JCL may be a collection of program module instructions which explain how program modules are to be executed or controlled, and PROC catalogued procedure may be a routine or set of repeatable instructions which may be exercised when identified for a particular process. Other information may also be requested.

At step 106, the user submits the first page of information to the ECMP. A new page requesting information is presented to the user by the ECMP at step 108. According to an embodiment of the invention, the new page presented to the user may be based on the information submitted by the user in the first page. By way of example, if the user indicates that that JCL/PROC changes will be made, the ECMP may present the user with another page of questions regarding further information about the JCL/PROC changes.

FIG. 5 illustrates an example of a graphic user interface 300 for presenting further questions about changes involving JCL/PROC according to an embodiment of the invention. While FIG. 5 illustrates one specific example of an additional page for presenting questions to the user, particularly about JCL/PROC changes, it is understood that a page or a plurality of pages may be presented in other manners, and that other types of information may be solicited from the user. Similar to the graphic user interface 200 illustrated in FIG. 4, graphic user interface 300 of FIG. 5 may include various areas for the user to provide information to the ECMP. An area may include a label 302 indicating a type of information requested and a data entry area 304 for the user to input the information requested. According to an embodiment of the invention, certain data entry areas may be automated, where the information is input by the ECMP. By way of example only, a date and a time of the last edit of JCL/PROC information may be automatically entered in an appropriate data entry area 304 when the user starts a new request. An area on graphic user interface 300 may also include a pull down menu 306, where the user pulls down a menu and select from a list. Other areas may also include a graphic button 308, where the user can activate a graphic button 308 to indicate an answer (e.g., activate a yes graphic button). Other manners of providing information may also be used.

In the example of changes involving JCL/PROC, the user may be presented questions regarding a number of new JCL submissions requiring changes, a number of existing JCL submissions currently requiring changes, whether there are restart or rerun requirements, a total amount of JCL being added or changed by the request, a total number of PROC changes being added or changed by the request, whether the changes affect a model office or affect production, whether the changes involves a new JCL or a PROC the JCL, PROC, or control cards being added or changed the user's job card name, a job identification number, and/or a test level library name where a JCL, PROC or control card resides; Control card may be instructions within JCL which identify various parameters, such as dates, and types of sorting categories. A job card may be instructions with JCL which identify a job, such as a job name or date. Other information may also be requested.

If further information about a mainframe used in connection with the production software system is necessary after the user submits the first page, the ECMCP may present the user with further questions. According to an embodiment of the invention, the ECMP may request information regarding a historical version of data or generation data group ("GDG") and a tape retention, such as a data set name, a number of entries to be made, a number of generations to be retained onsite, and the number of generations to be retained offsite. A request for information may be in the form of presenting a graphic user interface to the user, such as the graphic user interface 200 in FIG. 4 or the graphic user interface 300 in FIG. 5. For file allocation, the user may provide information about the name of the file to be allocated, and indicated whether a structured storage for automated data, such as a virtual storage access method ("VSAM") and/or sequential storage are needed Sequential storage may include storage where data is stored in a logical sequence, such as numerically, or by date. For file replacement, the ECMP may present questions regarding an input test name, an output production name, where the file is copied to, the date a new file is needed, a reel number, and what job is to be run. Other information may also be requested.

If additional information about a client server used in connection with the production software system is needed, the ECMP may present one or more pages with questions regarding an acceptance test server, a production test server, database changes, a job name, description of the changes, frequency of changes, the predecessor platform, the predecessor job, the successor platform, the successor job, operation instructions with any scheduling, a report name, a recipient name, contact information for the recipient and/or other information related to components associated with the client server system.

If additional information about one or more source control tools used in connection with a product software system is needed, the ECMP may present one or more pages with questions regarding the tool(s). By way of example, such as for a production turnover tool ("PanAPT"), information requested may include information regarding a move request number and/or an early stop. PanAPT may enable change management personnel to migrate enhancements into the model software system or the production software system. For a Poly Version Control Software™ tool ("PVCS"), information may include a version label, a module name, and/or a revision number. For a source of control ("SOC") tool for mainframe application, information may include an acceptance source library, a module name, a programming language used, a type of module, a production password, a plurality of composite links, and/or whether it uses an old or new source. For an APC tool, information may include a change control number ("CCN#") acceptance used as an identifier, an automated production control request for service number ("APCRFS#") acceptance for identifying scheduling requests, a CCN# production, and/or an APCRFS# production. For manual tools that handle any information which is not processed automatically, information may include a test level library name, a quality assurance library name, a production library name, and/or whether the library is a mainframe, a client server, a midrange or other type of library. Information about other types of source control tools may also be gathered within the ECMP.

If additional information about one or more distribution tools used in connection with a production software system is needed, the ECMP may present one or more pages with questions regarding the tool(s). By way of example, such as for a dispatch tool for handling the output of the system, information requested may include information regarding the name of a recipient, contact information for the recipient, a report name, such as within JCL or PROC, a job name, a class, such as a class determined by Dispatch, the number of copies needed, the frequency of copies, report title(s), such as a title determined by Dispatch, any special form as described in JCL, and/or any changes in a recipient's name or contact information. For a computer output laser disk ("COLD") tool for storing viewable output, information requested may include a report identification, such as form JCL or PROC, a job creating report, user defined requirements on how to index a report, and/or any COLD setup requirements determined by a department using a report, such as a department or folder designation. For report distribution system ("RDS") tool for handling output, information requested may include identification of a recipient user, such as the user ID, the user group, a report name, a job name, and/or the date needed. For a sysout archival and retrieval system ("SAR") tool for storing viewable output, information requested may include a report frequency (e.g., daily, weekly, monthly, etc.), and/or a report name. Other types of distribution tools may also be used in connection with the ECMP, and other information regarding the distribution tools listed above, or other types of distribution tools, may also be requested.

At step 110, the user submits the information requested on the page presented by the ECMP. The ECMP determines if an additional page should be presented to user at step 112. If an additional page is necessary, the ECMP returns to step 108 and presents another page to the user. According to an embodiment of the invention, the ECMP may present pages individually to the user. That is, the user receives the original page and submits the requested information. Based on the information submitted in response to the first page, one or more additional pages may be individually presented, with one additional page first being presented to the user. After the user submits the information requested by the first additional page, a second additional page, based on the information submitted in response to the original page, may be presented to the user. Alternatively, the second additional page may be presented to the user based on information submitted in response to the first additional page. Pages requesting information may also be presented in other ways.

If an additional page is not necessary, a determination is made by the user whether the form is complete at step 114. The user may review the form to ensure that all required information has been provided, and that the information is complete and accurate. According to an embodiment of the invention, the user may be able to save an incomplete form for completion at a later time. Thus, by way of example, the user may begin submitting information requested by ECMP, and realize that some information is not currently available, or that some information may be inaccurate and needs to be verified. The user may save the form within the ECMP without providing all of the information, and may return to the form to provide the necessary information when such information is available.

If the form is not complete, the user may edit previous submissions at step 130, and submit the information at step 106. As disclosed in the flowchart of FIG. 3, the user may be presented with another page based on the information submitted at step 106, and proceed through the process. It is understood that the user may edit information from the first page presented and/or other pages presented by the ECMP.

If the form is complete, the user may submit the form, with the information, to the ECMP at step 116. At step 118, the form received from the user is reviewed by the ECMP to determine if it is complete. According to an embodiment of the invention, the determination regarding whether the form is complete may be automatically made, manually, or by a combination of automatic and manual processes. An automatic determination regarding whether the form is complete may include determining if the user has provided information in all required fields. A manual determination regarding whether the form is complete may include personnel reviewing the form to ensure that the information submitted is complete and corresponds to the questions asked. According to an embodiment of the invention, personnel reviewing the form may include personnel associated with the change management module described above in connection with FIGS. 1 and 2 A combination of automatic and manual determination may also be used, with the ECMP determining whether the user has provided information in all required fields, and a change management person determining whether the information provided is complete and corresponds to the questions asked. Determining whether the form is complete may be performed in other manners as well.

If the form is complete, the ECMP for the user may end. If the form is not complete, the user may edit previous submissions at step 120, and submit the information at step 106. As disclosed in the flowchart of FIG. 3, the user may be presented with another page based on the information submitted at step 106, and proceed through the process. It is understood that the user may edit information from the first page presented and/or other pages presented by the ECMP.

As described above in step 101, according to an embodiment of the invention, the user may be presented with options on a start page, which may include starting a new request using the ECMP, editing a previously saved request using the ECMP, or editing a previously submitted request using the ECMP. If the user selects editing a previously saved request, or editing a previously submitted request using the ECMP, the user may edit previous submissions at step 120, and submit the information at step 106. As disclosed in the flowchart of FIG. 3, the user may be presented with another page based on the information submitted at step 106, and proceed through the process as illustrated in the flowchart of FIG. 3. It is understood that the user may edit information from the first page present and/or other pages presented by the ECMP.

As described above at step 100, the user of the ECMP indicates whether the developer start page or the change manager start page at step 100. If the user is a change manager, such as a change manager associated with the change management module described above in FIGS. 1 and 2, the change manager start page is presented to the user at step 122. A change manager may be assigned to each request through the ECMP. The change manager, using the request, may be in charge of ensuring that the necessary changes are implemented for one or more enhancements to a software system. The user may be presented with various information on the change manager start page, such as basic instructions, information about the software system using the ECMP, or other types of information that may be relevant to the change manager start page.

The change manager start page presents the user with a number of user options for selecting request forms to view at step 124, where each request from a developer has corresponding request form. The user options may include, but are not limited to, viewing all request forms, viewing saved request forms (e.g., request forms that have been saved, but not yet completed by the developer), viewing received request forms (e.g., new request forms awaiting change management review, but which do not have change management representatives currently assigned), viewing resent request forms (e.g., request forms that required new or additional information that has been provided by the developer), viewing accepted request forms (e.g., request forms that currently have a change manager assigned), viewing completed request forms (e.g., request forms that has been completed by change management), or other options.

At step 126, the user is presented with selected records. Each request form may be presented as a record, where only certain information is presented to the user.

FIG. 6 is a graphic user interface 400 illustrating an example of a record from a list of records to change management. The graphic user interface 400 may include an ECMP number 402, a date 404, a request for service (or RFS) number 406, a short record name 408, an application name 410, the developer name 412, a status 414, and a change manager assigned 416. For example, the record illustrated in the graphic user interface 400 may be identified as a new request as illustrated by the a specific designation in status 414. Records enable the user to simultaneously view some information about a number of records. The user may designate one or more request forms to view the associated request form in detail.

FIG. 7 is a graphic user interface 500 illustrating a request form to an embodiment of the invention. The detailed record may include information about a request date, a cost center, a project number, a task number, a short name, a platform, a source control tool, a distribution tool, a scheduling requirement, a JCL/PROC, a GDG, a tape retention, a file allocation, a file replacement, a SAR, the developer name, the developer contact information, the developer comments section, project leader(s), a status, a change manager, a change manager comments section, a list of completed data, and other information. According to an embodiment of the invention, information presented on detailed record may correspond to information provided by a user (such as a developer) on a first page of the ECMP, as described above in connection to step 104 of FIG. 3.

The request form may also include a plurality of information buttons 502 for accessing additional information. The user may activate (e.g., designate with a mouse) the information button 502 to have the additional information presented. The additional information may be presented in another page, or may be presented on the same page. According to an embodiment of the invention, the additional information may be presented on pages which correspond to information provided by a user (such as a developer) on other pages of the ECMP, as described above in connection with step 108 of FIG. 3.

The request form may also include areas for the user to input change management information. An area may include a label 504 indicating a type of information to be entered and a data entry area 506 for the user to input the information. By way of example, the label 504 may indicate user comments are requested, while the data entry area 506 enables the user to provide the comments. Other manners of providing information may also be used.

At step 128, the user designates a request form. The user may designate a request form for another user (e.g., another change manager) at step 138, may send a request form back to a user (e.g., a developer) for more information at step 132, or may accept the request form at step 134. According to an embodiment of the invention, accepting a request form may include the user providing information, including the name of the user, any user comments, and the date the request is completed. According to an embodiment of the invention, the user may access a request form a number of times to provide information as information is needed and/or relevant. By way of example, the user may continue to provide user comments as any project changes occur, and then may indicate the completion date of the change request.

At step 136, the user may determine whether to view another request form. If the user decides to view another request form, the user may select a record to review at step 124. If the user decides not to review another request form, the user may end the ECMP. Other methods of using an electronic change management process may also be used.

Assurance Tool of Migration Strategies (Atoms)

Figure 8:
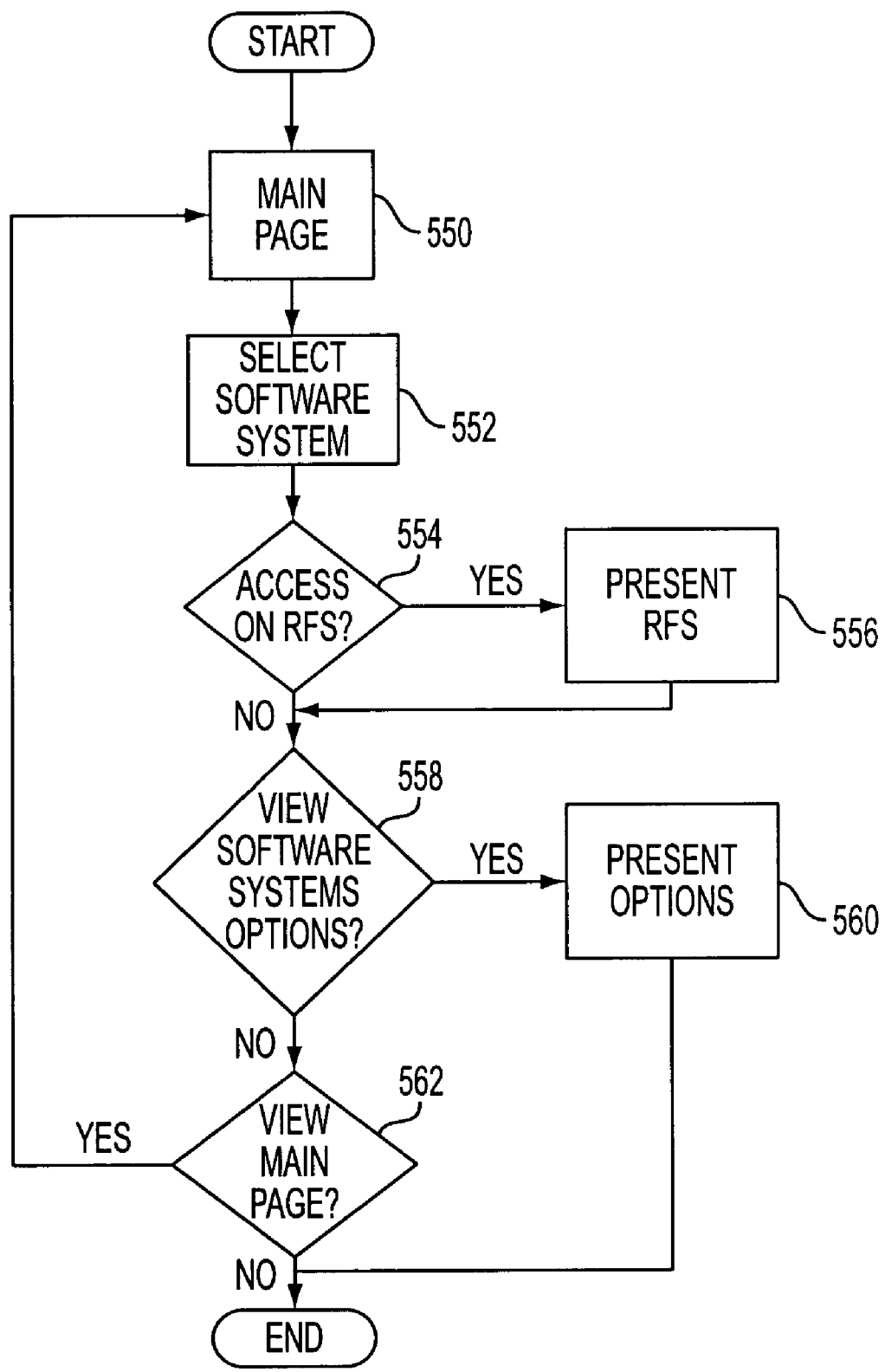
FIG. 8 is a flowchart illustrating steps in a process for using an assurance tool of migration strategies according to an embodiment of the invention.

As described above, an assurance tool of migration strategies the (ATOMS) may be used in connection with an overall change management process as a tool for tracking changes. According to an embodiment of the invention, ATOMS may be an online system that records source changes within a software system and provides updates so that all developers involved with one or more enhancements changes to the software system may see the one or more enhancements or changes as early in the process as possible. The ATOMS may be used for both production software systems and model software systems While a process using ATOMS process is illustrated in FIG. 8 as certain steps performed in a particular order, it is understood that the present invention may be practiced by adding steps to the process, omitting steps within the process, and/or altering the order in which the steps are performed in the process.

At step 550, the user starts the ATOMS is presented with a main page. The main page may include general introductory information regarding the ATOMS, such as a title, a tool bar enabling the user to print, save, access help and use other functions, navigation instructions, and other information. According to an embodiment of the invention, the ATOMS may be used for multiple software systems. The main page may also present options for selecting a system to view. By way of example, the main page may present a graphic button for each software system, where the user accesses a particular software system by activating the graphic button associated with it. Other manners for selecting from a plurality of software systems may also be used.

At step 552, the user determines which software system to access. As set forth above, the ATOMS may be used with multiple software systems. The ATOMS may enable the user to select a particular software system to access one or more enhancements and changes within.

Figure 9:
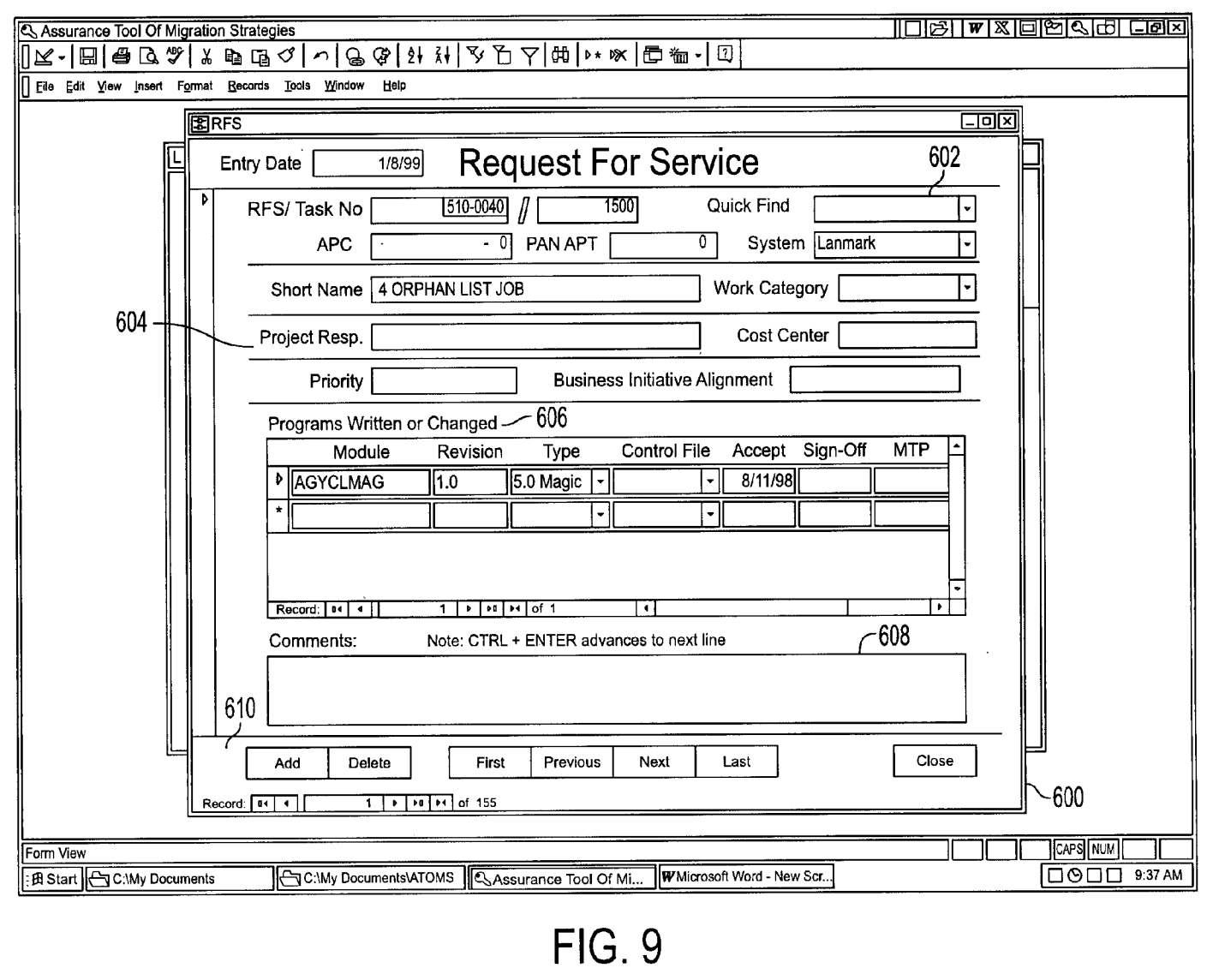

At step 554, the user determines whether to access a request for services ("RFS") function. If the RFS function is selected, the user is presented an RFS page at step 556. The RFS page may enable the user to add a new RFS record to the system, update an existing RFS record, and/or locate an RFS record in the system. As illustrated in graphic user interface 600 of FIG. 9, the RFS record may include various areas for the user to input requested information, and request various records to view. The requested information may enable the ATOMS to manage and track changes, including conflicts between enhancements. A quick find area 602 may enable the user to enter a particular RFS record identification to access an RFS record. According to an embodiment of the invention, a pull-down menu comprising a list of RFS record identification may be presented for the user to select a particular RFS record. Based on the input, the user may be able to view the particular RFS record.

While viewing the particular RFS record, the user may change information or graphic user interface 600, including updating new information. The information viewed may include basic information in area 604, such as an RFS record identification (e.g., an identification number), a date the RFS record was originally entered, a short name for the RFS, a person or persons responsible for a project associated with an RFS, the priority associated with the project, and other information.

Additional information may be presented in a Programs Written Area 606. The additional information presented in the Programs Written Area 606 may include a type of program (e.g., 5.0 Magic, Java script, etc.) which has been written or changed, and a control file. A control file may be a collection program modules of a particular type within a business application. The Programs Written Area 606 may also present sign-off information for indicating a date on which one or more changes a particular program module were approved (e.g., signed-off on) for migration into a particular software system. A move to production ("MTP") field in the Programs Written Area 606 may be used to remove files with no conflicts from a report associated with a conflict and program module migration. Additionally, an MTP field may indicate a date and/or a time a program module has migrated to a software system. Other information within the Programs Written Area 606 may include storing a file associated with a table, and the status of a program.

The graphic user interface 600 may also include a Comments Area 608 for providing comments about an RFS record. Comments may include special instructions for the RFS record, details about a particular program module in a software system, changes to the RFS record, or other comments.

The graphic user interface 600 may also include a Navigation Area 610 for navigating between multiple RFS records. According to an embodiment of the invention, the Navigation Area 610 may have a first button for viewing the first RFS record for a system, a previous button for viewing the RFS record displayed before the RFS record currently viewed, a next button for viewing the RFS record displayed after the RFS record currently viewed, and/or a last button for viewing the last RFS record for a software system. Further, the Navigation Area 610 may include a delete function for deleting the RFS record, such as the record currently displayed when the delete function is activated. A close function may also be included, enabling the user to close the RFS record. An "add new" function may also be presented, allow the user to create a new RFS record and enter the appropriate information, such as the information described above. Other functions may also be presented on the Graphic User interface 600.

With the functions presented, the user may manipulate one or more RFS records presented to the user, such as by adding information as necessary in an RFS record, changing information in an existing RFS record, adding information to an existing record, or other manipulations of an RFS record. Further, the user may navigate between RFS records, whether moving from one to another, or selecting a particular RFS record to view.

If the user has entered information at step 556, or has decided not to add a new RFS record entry at step 554, the user may decide whether to view system options at step 558. If the user elects to view a system's options, the user may be presented various options to view at step 560.

It is understood that each software system may have various options, with some options unique to a particular system, while other options are common to two or more systems. Presenting various options may include presenting the user with a graphic user interface with graphic buttons for enabling the user to select an option. According to an embodiment of the invention, the various options may include finding and viewing a plurality of RFS records linked within a particular software system, updating program modules within the particular software system, inputting a "what if" query, viewing program modules in production, viewing program modules not in production, viewing software system conflicts, viewing software system linked program modules, viewing software system production moves, and/or other options.

Finding and viewing an RFS record linked within a particular system may include inputting an RFS record identification for a presentation. The user may input a particular identification for an RFS record. The RFS record associated with the identification may be displayed for a particular software system. Alternatively, the user may be presented with a pull-down menu for accessing a list of RFS records from which to select. According to another embodiment of the invention, the user may search for an RFS record based on information within the RFS record. The user may input a search request (e.g., all RFS records that include "5.0 Magic"), and receive a listing of any RFS records which meet the search criteria.

The ATOMS may display the RFS record requested, as well as all of the RFS records linked to the RFS record requested. Displaying linked RFS records may enable the user to determine how the RFS records are related within a particular software system, and how various changes and additions of program modules are related and affect other aspects of the software system, including other program modules. The user may view the RFS record requested, and/or may view one or more related RFS records. Other manners of finding and viewing a particular RFS record may also be used.

Updating program modules within a software system may include entering an identification for one or more program modules (e.g., an identification number) or accessing a pull-down menu of program modules. The ATOMS may display information on one or more program modules, such as an RFS record identification number, a task number, a program module identification number, a date and/or a time a change or addition has been accepted, a date and/or a time a change or addition was moved, and other information.

Inputting a "what if" query may include allowing the user to project a change in conflicts between program modules by altering information associated with the program module. By way of example only, the user may change a sign-off date for approving a program module. Based on the new sign-off date, software system conflicts may be viewed to determine the impact of conflicts between one or more enhancements associated with that program module and one or more enhancements associated with other program modules. Other information may also be changed.

Program modules in production and program modules not in production may include designating one or more program modules and/or types of and listing all such program modules that are in production, and all such program modules which are not in production. Program modules in production may comprise program modules which have been accepted, signed-off on, and have been moved to production ("MTP") in the software system. Program modules not in production may comprise program modules which are in various stages of completion, but have not yet be moved to production in the applicable software system. The user may designate Magic program modules, executable files or other types of files to view what program modules are in production and what program modules are not in production. Families of requests (or files, documents, program modules, databases, etc.) which have no programmatic link, but which are functionally associated, may be grouped together as well.

Viewing software system conflicts may include a list of program modules and enhancements scheduled for each program module. According to an embodiment of the invention, in a process using ATOMS process, a conflict may indicate an enhancement to a program module that has not yet been implemented in that or other related program modules. The program module may then be prevented from migrating to the software system until all changes and/or additions have been made to that program module or other related program modules.

A plurality of linked program modules may include a plurality of program modules that are linked to each other through an RFS record, a change, an addition, a deletion and/or other connection. By way of example, an enhancement to a software system may include changing a format of how data is stored in a database. This change to the software system may in turn involve changing a data entry presentation to an end user of the software system, changing how the data entered by the end user is sorted and categorized, and changing how the data is stored within the database. This change to the system may require a plurality of changes in a plurality of program modules to enact the enhancement within the software system. One aspect of the ATOMS may provide for ensuring that all necessary program modules have been changed (e.g., all conflicts between program modules have been resolved) before migration of the enhancement to the software system. Viewing linked program modules allows the user to determine the progress of an overall software system change.

A plurality of software system production moves may include when and how enhancements (e.g., changed or added program modules) have been or will be moved to the software system in the software system. The user may determine when program modules are scheduled to be moved to the software system, or when a particular program module was moved into the software system. Other options may also be presented.

If the user has viewed software system options at step 560, or has decided not to view software system options at step 558, the user may decide whether to view the main page at step 562. If the user elects to view the main page, the user may be presented the main page at step 550. If the user elects not to view the main page, the user may end the ATOMS.

The ATOMS may enable the user to view information associated with enhancements (e.g., changes and/or additions to one or more program modules) within one or more software systems. Further, ATOMS may alert the user to one or more potential conflicts or problems with modifying and migrating program modules within the software system.

Measurement Based Training ("MBT")

Using the information associated with the change management process, the ECMP document, and the ATOMS, one or more measurement based training ("MBT") evaluations may be made regarding a speed and a quality of enhancements that are implemented in program modules and software systems. According to an embodiment of the invention, an object evaluation using a quantified calculation may be created. Use of the a quantified calculation may enable a more efficient and objective evaluation technique while avoiding the ad hoc "personal" aspects of the evaluation.

Figure 10:
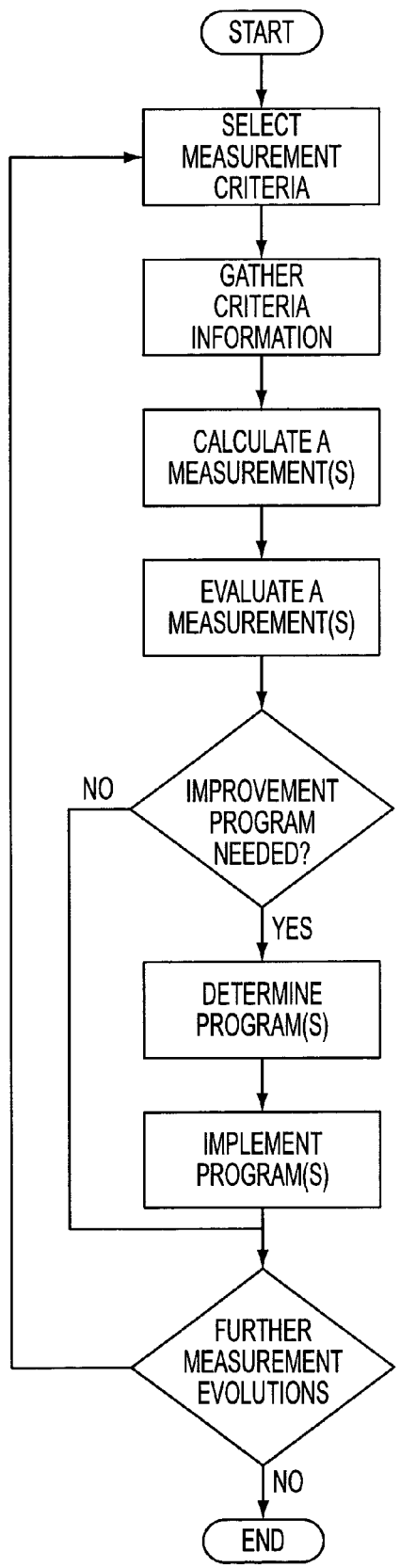
FIG. 10 is a flowchart illustrating steps in a process for management-based training according to an embodiment of the invention.

FIG. 10 is a flowchart illustrating a plurality of steps conducted in a process for performing an MBT evaluation according to an embodiment of the invention. Upon starting the process, the user determines a plurality of MBT criteria to be used at step 700. The MBT criteria may include an evaluation of a plurality of program module moves for one or more types of program modules, a plurality of program module moves over a set time period, a plurality of moves for a particular request for service (RFS), a plurality of model software system moves, a plurality of production software system moves, a plurality of moves by resource (e.g., by the developer, a team, an office, a project, etc.) or one or more other moves, or some combination thereof. By way of example only, the user may determine that the MBT criteria should include all model and production software system moves of program modules by a particular developer for the period of one year. Other MBT criteria and combinations of criteria may also be used.

At step 702, information related to the selected MBT criteria is gathered. According to an embodiment of the invention, the selected MBT criteria may be gathered from the ATOMS, RFS records, the ECMP document, or other sources of information. The appropriate information necessary to perform an evaluation based on the MBT criteria selected by the user may also be gathered.

At step 704, an MBT measurement is calculated. According to an embodiment of the invention, an MBT measurement is calculated based on the gathered selected MBT criteria and other information related to the selected MBT criteria. The MBT measurement may be a statistical calculation performed on the gathered information. By way of an example, the MBT measurement may be made for a particular developer for all program module moves, both for model and for production, within a software system for a two year period. Information gathered for an MBT measurement may indicate that 75 program modules were moved, that there were 10 opportunities for a defect to occur for each of the 75 program modules moved, but that 4 defects occurred in the 75 program modules. The defects per unit ("DPU") MBT measurement for the developer may be equal to a number of defects divided by the total number of program modules moved. In this example, DPU equals 4/75=0.053. The defects per opportunity ("DPO") for the developer may be equal to the number of defects divided by a product of a total number of program modules and the total number of opportunities for defects per program module unit. In this example, DPO equals 4/(10*75)=0.0053. The defects per million ("DPM") MBT measurement may be equal to the product of the DPO and 1,000,000. In this example, DPM equals 5,333. Using these calculations, an object evaluation may be made of the enhancements performed by the developer.

According to an embodiment of the invention, various measurements may be used to objectively evaluate a developer in the context of the six sigma approach, as is well known in corporate management. By way of example, a DPM of 44,600 may receive a sigma conversion of 3.2 and a yield of 96.54%, while a DPM of 5,210 may receive a sigma conversion of 4.0 and a yield of 99.379%. Use of sigma conversion may enable an objective evaluation of a developer, using established techniques to determine the acceptable error rate for a developer. Other manners for creating an objective evaluation may also be used.

At step 706, the user evaluates one or more calculated MBT measurements. Using this objective measure, the user may evaluate the performance. According to an embodiment of the invention, an evaluation may allow for comparisons with different numbers of factors. By way of an illustrative example, comparing DPO's may allow for a comparison between the developer with 75 model and production moves of program modules with 8 opportunities for defects in each program module, and the developer with 133 model and production moves of program modules with 7 opportunities for defects in each program module. Further, an evaluation may be made based on objective evaluation criteria created before the evaluation. By way of an illustrative example, the user may determine that for the developer to avoid corrective action, a DPM of 30,000 is a maximum, while a DPM of 60,000 is a maximum to avoid decisive corrective action. The user may then calculate the DPM for developers and objectively evaluate the developer based on the predetermined evaluation criteria.

According to another embodiment of the invention, defects may be added and charted. By way of example, all developers in a particular office may be listed in a chart. The chart may also contain the number of program modules and RFS's worked on, as well as the number of program modules moved (both model and production) and the number of program module defects (e.g., the number of program modules that needed to be reworked.)

At step 708, the user determines whether one or more improvement programs are needed. According to an embodiment of the invention, such one or more improvement programs may include one or more training programs, one or more mentoring programs, one or more coaching programs, and/or other types of programs may be used. A training program may include training the developer in specific areas associated with the defects attributed to the developer. A mentoring program may include assigning a mentor, such as another developer, to the developer associated with the defects. The mentor may provide guidance and feedback to the developer. A coaching program may assign a person to review program modules worked on by the developer. Improvement programs for the developer may be used to assist the developer in improving various aspects of the developer's work, thereby improving the quality of the developer's work. Further, the MBT process may enable the specific weaknesses of the developer to be addressed, thereby allowing more efficient use of improvement programs.

If an improvement program is necessary, the user determines what type or types of improvement programs are best suited for the developer at step 710, and the improvement program(s) is then implemented at step 712. When the improvement program(s) has been implemented, or if the user determines that no improvement program is necessary, the user determines whether other MBT criteria should be used for evaluating the same developer or another developer at step 714. If other MBT criteria should be used, the user determines what MBT criteria are to be used at step 700. By way of example, the user may evaluate several developers, one after another. If no other MBT criteria are to be used, the user can end the MBT process.

Figure 11:
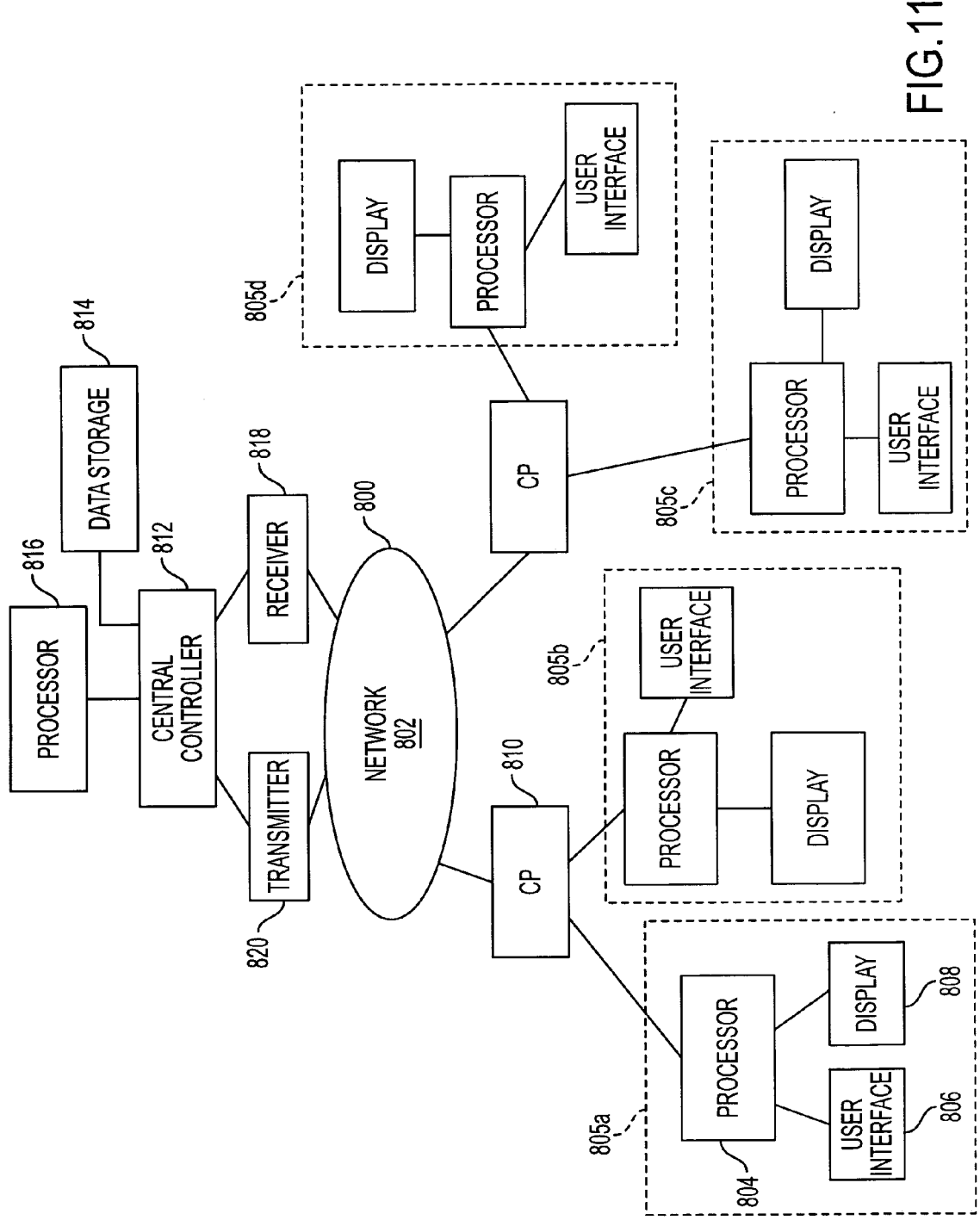
FIG. 11 is a schematic representation of a system for implementing one or more of the processes described according to embodiments of the invention.

FIG. 11 illustrates a system 800 according to an embodiment of the present invention. The system 800 comprises multiple requester devices 805 (or "computers") used by a plurality of requesters to connect to a network 802 through multiple connector providers (CPs) 810. The network 802 may be any network that permits multiple requesters or computers to connect and interact. According to an embodiment of the invention, the network 802 may be comprised of a dedicated line to connect the plurality of the requesters, such as the Internet, an intranet, a local area network (LAN), a wide area network (WAN), a wireless network, or other type of network. The CP 810 may be a provider that connects the requesters to the network 802. For example, the CP 810 may be an Internet service provider (ISP), a dial-up access means, such as a modem, or other manner of connecting to the network 802. In actual practice, there may be significantly more users connected to the system 800 than shown in FIG. 11. This would mean that there would be additional requesters which are connected through the same CPs shown or through other CP 800. Nevertheless, for purposes of illustration, the discussion will presume four requester devices 805 are connected to the network 802 through two CPs 810.

According to an embodiment of the invention, requester devices 805a–805d may each make use of any device (e.g., a computer, a wireless telephone, a personal digital assistant, etc.) capable of accessing the network 802 through the CP 810. Alternatively, some or all of the requester devices 805a–805d may access the Network 802 through a direct connection, such as a T1 line, or similar connection. FIG. 11 shows the four requester devices 805a–805d, each having a connection to the network 802 through a CP 810a and 810b. The Requester devices 805a–305d may each make use of a personal computer such as a computer located in the requester's home, or may use other devices which allow the requester to access and interact with others on the network 802. Central controller module 812 may also have a connection to the Network 802 as described above. A central controller module 812 may communicate with one or more data storage modules 814, the latter being discussed in more detail below.

Each of the requester devices 805a–805d used may contain a processor module 804, a display module 808, and the user interface module 306. Each of the requester devices 805a–805d may have at least one user interface module 806 for interacting and controlling the computer. The user interface module 806 may be comprised of one or more of a keyboard, a joystick, a touchpad, a mouse, a scanner or any similar device or combination of devices. Each of the computers 805a–805d used by requester devices 805a–805d may also include a display module 808, such as a CRT display or other device.

The system 800 further includes the central controller module 812. The central controller module 812 may maintain a connection to the network 802 such as through transmitter module 818 and a receiver module 820. The transmitter module 818 and the receiver module 820 may be comprised of conventional devices which enable the central controller module 812 to interact with the network 802. According to an embodiment of the invention, the transmitter module 818 and the receiver module 820 may be integral with the central controller module 812. The connection to the Network 802 by the central controller module 812 and computers 805 may be a high speed, large bandwidth connection, such as though a T1 or a T3 line, a cable connection, a telephone line connection, a DSL connection, or other type of connection. The central controller module 812 functions to permit the requester devices 805a–805d to interact with each other in connection with various applications, messaging services and other services which may be provided through the System 800.

The central controller module 812 preferably comprises either a single server computer or a plurality of multiple server computers configured to appear to the requester devices 805a–805d as a single resource. The central controller module 812 communicates with a number of data the storage modules 814. Each of the data storage modules 814 stores a plurality of digital files. According to an embodiment of the invention, any of the data storage modules 814 may be located on one or more data storage devices, where the data storage devices are combined or separate from the controller module 812.

A processor module 816 performs the various processing functions required in the practice of the process taught by the present invention, such as generating an ECMP document, creating an RFS record, and linking RFS records. The processor module 816 may be comprised of a standard processor, such as a central processing unit (CPU), which is capable of processing the information in the necessary manner.

While the system 800 of FIG. 11 discloses the requester device 805 connected to the network 802, it should be understood that a personal digital assistant ("PDA"), a mobile telephone, a television, or another device that permits access to the Network 802 may be used to arrive at the system of the present invention.

According to another embodiment of the invention, a computer-usable and writeable medium having a plurality of computer readable program code stored therein may be provided for practicing the process of the present invention. The process and system of the present invention may be implemented within a variety of operating systems, such as Windows®, various versions of a Unix based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system 800 may comprise computer readable program code in the form of functional instructions stored in the computer-usable medium such that when the computer-usable medium is installed on the system 800, those components cause the system 800 to perform the functions described. The computer readable program code for the present invention may also be bundled with other computer readable program software.

According to one embodiment, the central controller module 812, the data storage 814, the processor module 816, the receiver module 818, and the transmitter module 820 may comprise computer-readable code that, when installed on a computer, perform the functions described above. Also, only some of the components may be provided in computer-readable code.

Additionally, various entities and combinations of entities may employ a computer to implement the components performing the above described functions. According to an embodiment of the invention, the computer may be a standard computer comprising an input device, an output device, a processor device, and data storage device. According to other embodiments of the invention, various components may be different department computers within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, a system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A process for managing a migration of one or more enhancements of a production software system, where the production software system comprises a plurality of program modules, the process comprising the steps of:
   receiving at least one enhancement from the developer, wherein the at least one enhancement is an enhancement to software code;
   receiving approval of the quality of the at least one enhancement from a quality assurance module;
   analyzing the at least one enhancement to ensure conformity with the model software system;
   migrating the at least one enhancement to the model software system, where the model software system comprises an equivalent of the production software system;
   analyzing the migration of the at least one enhancement to the model software system;
   analyzing the at least one enhancement to ensure conformity with the production software system;
   migrating the at least one enhancement to the production software system; and
   notifying at least one entity of the migration of the at least one enhancement to the production software system.

2. The process according to claim 1, wherein the enhancement is one of a new program module or a modified program module.

3. The process according to claim 1, wherein the step of analyzing the at least one enhancement to ensure conformity with the model software system further comprises reviewing a request for service record associated with the at least one enhancement.

4. The process according to claim 1, wherein the step of analyzing the at least one enhancement to ensure conformity with the model software system further comprises determining a schedule for running the at least one enhancement after it is migrated into the model software system.

5. The process according to claim 1, wherein the step of analyzing the at least one enhancement to ensure conformity with the model software system further comprises reviewing instructions for migrating the at least one enhancement into the model software system.

6. The process according to claim 1, wherein the step of analyzing the at least one enhancement to ensure conformity with the model software system further comprises determining at least on distribution location for the at least one enhancement for migration.

7. The process according to claim 1, wherein the step of analyzing the at least one enhancement to ensure conformity with the production software system further comprises reviewing a request for services record associated with the at least one enhancement.

8. The process according to claim 1, wherein the step of analyzing the at least one enhancement to ensure conformity with the production software system further comprises determining a schedule for running the at least one enhancement after it is migrated into the production software system.

9. The process according to claim 1, wherein the step of analyzing the at least one enhancement to ensure conformity with the production software system further comprises reviewing instructions for migrating the at least one enhancement into the production software system.

10. The process according to claim 1, wherein the step of analyzing the at least one enhancement to ensure conformity with the production software system further comprises determining a distribution of the at least one enhancement for migration.

11. The process according to claim 1, wherein the at least one entity comprises one of:
   a) the quality assurance module;
   b) the developer; and
   c) an end user of the production software system.

12. The process according to claim 1, further comprising the step of resolving conflicts between the at least one enhancement and the model software system.

13. The process according to claim 1, further comprising the step of resolving conflicts between the at least one enhancement and the production software system.

14. The process according to claim 1, further comprising the step of preparing the at least one enhancement for migration to the model software system based on the analysis of the at least one enhancement for conformity with the model software system.

15. The process according to claim 1, further comprising the step of preparing the at least one enhancement for migration to the production software system based on the analysis of the at least one enhancement for conformity with the production software system.

16. A system for managing a migration of one or more enhancements of a production software system, where the production software system comprises a plurality of program modules, the system comprising:
   a receiver module for:
      a) receiving at least one enhancement from the developer, wherein the at least one enhancement is an enhancement to software code; and
      b) receiving approval of the quality of the at least one enhancement from a quality assurance module;
   a processor module for:
      a) analyzing the at least one enhancement to ensure conformity with the model software system;
      b) analyzing the migration of the at least one enhancement to the model software system; and
      c) analyzing the at least one enhancement to ensure conformity with the production software system; and
   a transmitting module for:
      a) migrating the at least one enhancement to the model software system, where the model software system comprises an equivalent of the production software system;

b) notifying at least one entity of the migration of the at least one enhancement to the production software system; and c) migrating the at least one enhancement to the production software system.

17. The system according to claim 16, wherein the enhancement is one of a new program module or a modified program module.

18. The system according to claim 16, wherein analyzing the at least one enhancement to ensure conformity with the model software system further comprises reviewing a request for service record associated with the at least one enhancement.

19. The system according to claim 16, wherein analyzing the at least one enhancement to ensure conformity with the model software system further comprises determining a schedule for running the at least one enhancement after it is migrated into the model software system.

20. The system according to claim 16, wherein analyzing the at least one enhancement to ensure conformity with the model software system further comprises reviewing instructions for migrating the at least one enhancement into the model software system.

21. The system according to claim 16, wherein analyzing the at least one enhancement to ensure conformity with the model software system further comprises determining at least on distribution location for the at least one enhancement for migration.

22. The system according to claim 16, wherein analyzing the at least one enhancement to ensure conformity with the production software system further comprises reviewing a request for services record associated with the at least one enhancement.

23. The system according to claim 16, wherein analyzing the at least one enhancement to ensure conformity with the production software system further comprises determining a schedule for running migrating the at least one enhancement after it is migrated into the production software system.

24. The system according to claim 16, wherein analyzing the at least one enhancement to ensure conformity with the production software system further comprises reviewing instructions for migrating the at least one enhancement into the production software system.

25. The system according to claim 16, wherein analyzing the at least one enhancement to ensure conformity with the production software system further comprises determining a distribution of the at least one enhancement for migration.

26. The system according to claim 16, wherein the at least one entity comprises one of:

a) the quality assurance module;

b) the developer; and c) an end user of the production software system.

27. The system according to claim 16, wherein the processor module resolves conflicts between the at least one enhancement and the model software system.

28. The system according to claim 16, wherein the processor module resolves conflicts between the at least one enhancement and the production software system.

29. The system according to claim 16, wherein the processor module prepares the at least one enhancement for migration to the model software system based on the analysis of the at least one enhancement for conformity with the model software system.

30. The system according to claim 16, wherein the processor module prepares the at least one enhancement for migration to the production software system based on the analysis of the at least one enhancement for conformity with the production software system.

* * * * *